Oct. 5, 1965

E. J. KUMP 3,210,534

ENVIRONMENTAL CONTROL SYSTEM

Filed July 20, 1962

INVENTOR.
ERNEST J. KUMP
BY
*Flehr and Swain*
ATTORNEYS

Oct. 5, 1965

E. J. KUMP 3,210,534

ENVIRONMENTAL CONTROL SYSTEM

Filed July 20, 1962

INVENTOR.
ERNEST J. KUMP
BY
*Flehr and Swain*
ATTORNEYS

Oct. 5, 1965

E. J. KUMP 3,210,534

ENVIRONMENTAL CONTROL SYSTEM

Filed July 20, 1962

*INVENTOR.*
ERNEST J. KUMP

BY

*Flehr and Swain*

ATTORNEYS

Oct. 5, 1965

E. J. KUMP 3,210,534

ENVIRONMENTAL CONTROL SYSTEM

Filed July 20, 1962

INVENTOR.
ERNEST J. KUMP
BY
Flehr and Swain
ATTORNEYS

United States Patent Office 3,210,534
Patented Oct. 5, 1965

3,210,534
ENVIRONMENTAL CONTROL SYSTEM
Ernest J. Kump, 101 Alma, Palo Alto, Calif.
Filed July 20, 1962, Ser. No. 211,350
21 Claims. (Cl. 240—9)

This invention relates to environmental control systems and more particularly to a grid-like environmental control system for use in buildings and the like.

In the usual construction of buildings such as schools, offices and apartment houses, the structural portion is completed prior to the installation of any environmental equipment such as lighting, heating, air conditioning and the like. Installation of the environmental equipment requires the use of ladders, scaffolding and the like. Generally, the space into which it is placed is not easily accessible. Consequently, installation is expensive due to the labor required.

Even in the recently developed lift-up construction, wherein each of the various concrete floors of a building are poured at ground level and subsequently lifted to their destined level, the environmental equipment is not installed until the building is structurally complete.

Present day environmental control systems include a number of independent installations. For example, the electrical, air conditioning and heating, acoustic, and the lighting units are independent installations. This requires considerable space, material and installation time.

It is, therefore, a general object of this invention to provide an improved environmental control system.

It is a more particular object of this invention to provide an environmental control system which may, in a single package, combine several environmental control functions.

It is another object of this invention to provide an environmental control system of the aforementioned character wherein a single grid accommodates any combination of the following: lighting, heating, acoustic control and air conditioning.

It is another object of the present invention to provide an environmental control system which incorporates electrical, heating, acoustic and air conditioning units in a single structure.

These and other objects and features of the invention will become more clearly apparent from the following description taken in conjunction with the accompanying drawing, in which.

Figure 1:
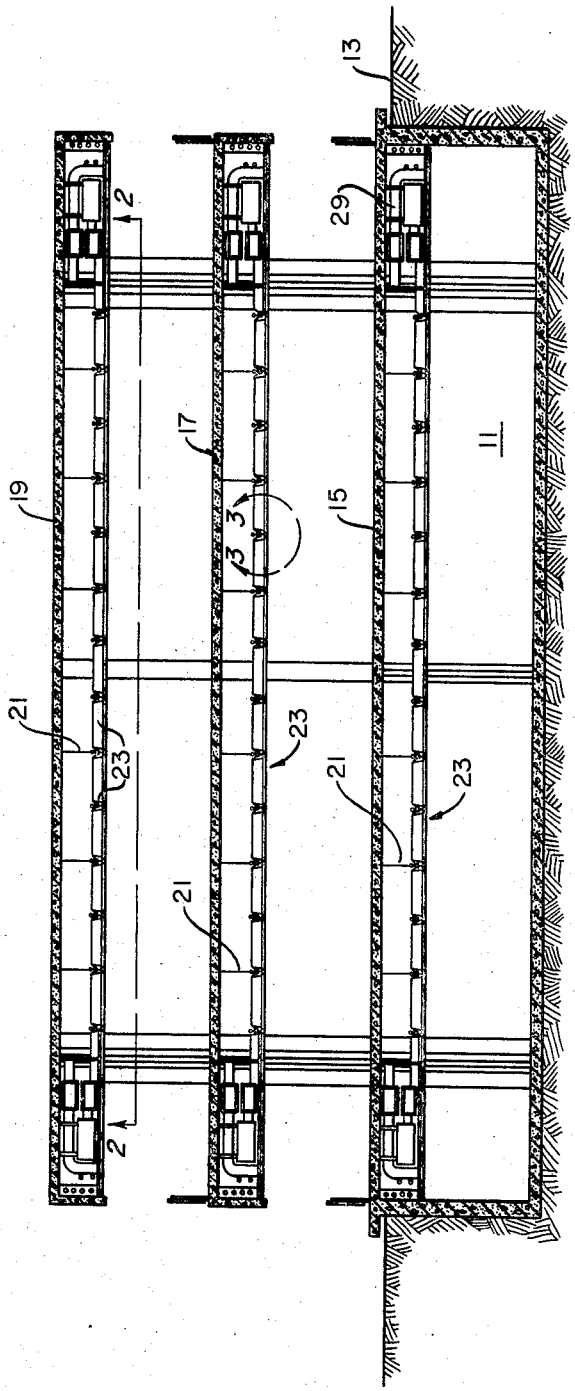
FIGURE 1 is a sectional elevation of a building employing an environmental control system in accordance with one embodiment of the invention.
Figure 2:
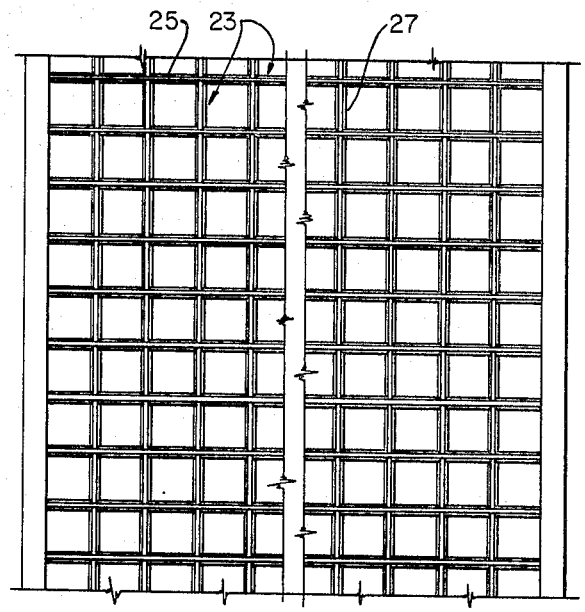
FIGURE 2 is a plan view taken along the line 2—2 of FIGURE 1.

Referring to FIGURE 1, there is shown an elevational view of a building which may be constructed in accordance with the lift-up method. Thus, it is seen that there is a basement 11 below the ground level 13 together with first and second floors 15 and 17, respectively, and a roof 19. The underside of each of the floors as well as the roof serves as a ceiling and may desirablly be of the reflective type. Suspended below each of the ceilings by means of hangers 21 is an environmental system 23 in accordance with this invention. The system may include, as seen more clearly in FIGURE 2, a plurality of parallel ducts 25 which are crossed by another plurality of parallel ducts 27. As will be seen hereinafter, the ducts 25 and 27 are joined together to form an integral structure.

Referring again to FIGURE 1, an air distribution system 29 may be connected at each end of the duct work 23 and may include heating and/or air-conditioning elements. Thus, as will be apparent hereinafter, air may be passed from the air distributor 29, through the duct work and similarly returned through the duct work to the distributor itself.

Figure 3:
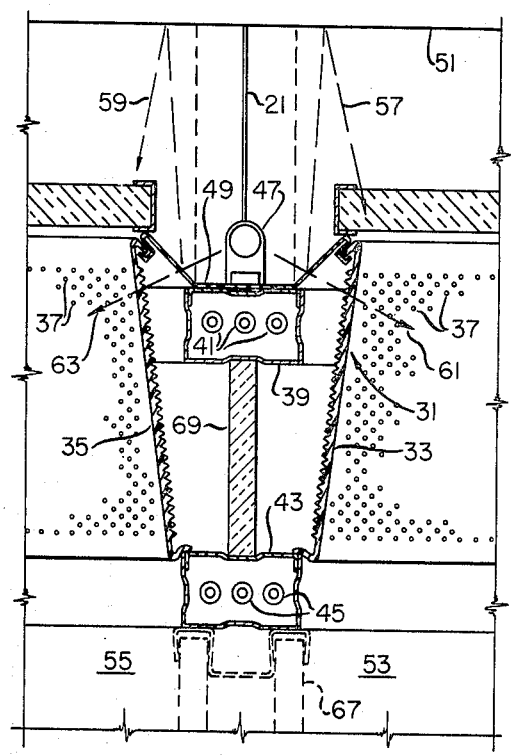
FIGURE 3 is a detailed sectional view taken along the lines 3—3 of FIGURE 1 showing one embodiment of the invention.
Figure 4:
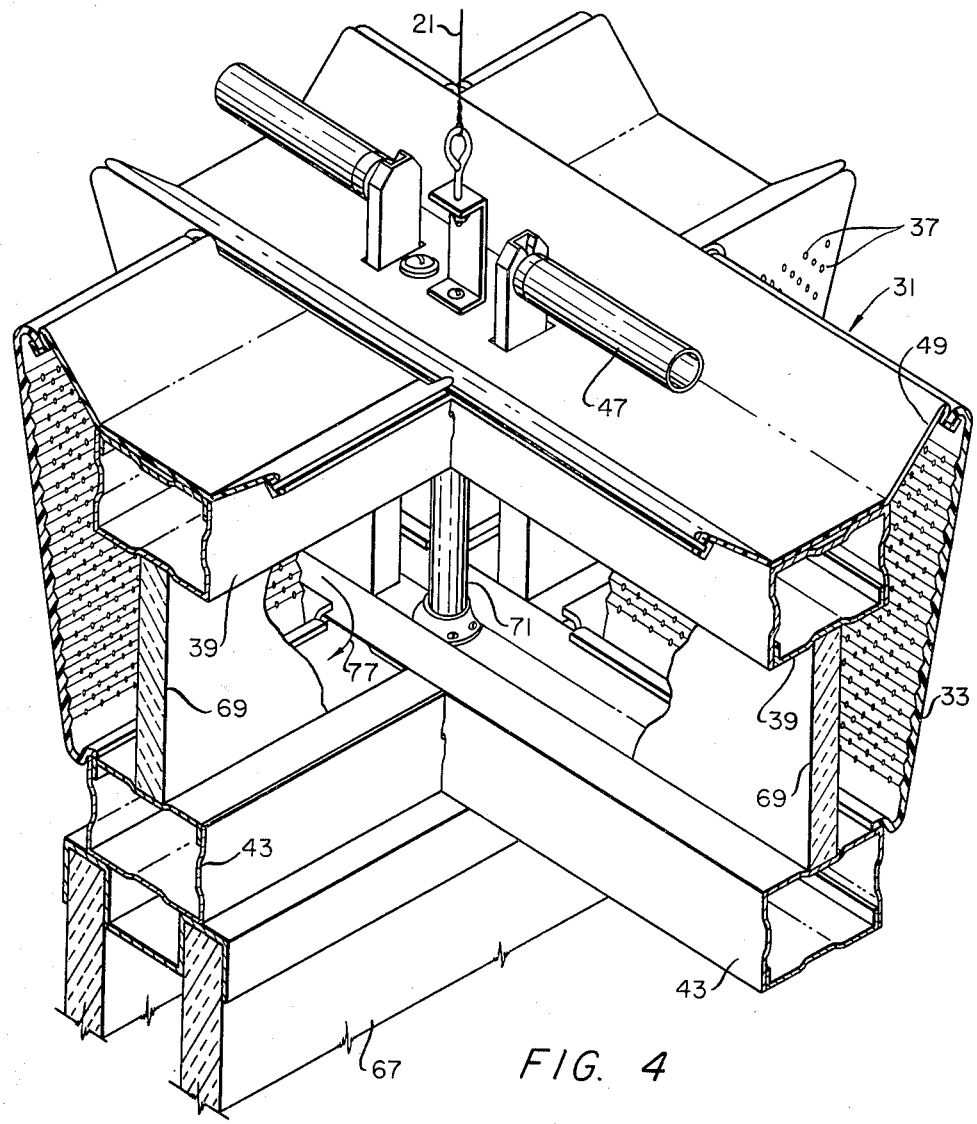
FIGURE 4 is an enlarged perspective view showing the intersection of two segments of the grid network shown in FIGURE 3.

Referring to FIGURES 3 and 4, there is shown in more detail, one embodiment of the invention. The structure includes an elongated duct 31 which may be called an environmental duct. The duct has side walls 33 and 35 each including distributed perforations 37 throughout. The term "distributed perforations" herein is intended to mean perforations which are distributed over a wide area of the walls 33 and 35 as can be seen in FIGURE 3, wherein the effect is to provide a substantially porous wall. The top wall of the elongated duct may include a conduit 39 for receiving wires and cables 41. The bottom wall may be still an additional conduit 43 for receiving wires 45 and also serving to support the grid system. The cables 41 may serve to supply electricity to lighting fixtures to be described hereinafter, while the cables 45 may be used for such other systems as audio, video, intercoms as well as signal or clock systems.

A lighting fixture such as a fluorescent tube fixture 47 is secured to the elongated environmental duct 31 on the top wall thereof.

In one embodiment of the invention, the top wall 49 may be in the form of a reflector, so that light from the fixture 47 is reflected in an upward direction. Thus, the light is reflected onto the ceiling 51 and down to the rooms 53 and 55 as shown by the dashed lines 57 and 59, respectively.

Alternatively, both the top wall portion 49 and the side walls 33 and 35 may be formed of a translucent material, so that light from the fixture 47 may be transmitted through the top wall 49 and the side walls 33 and 35 as shown by the dashed lines 61 and 63, respectively, as well reflected as from the ceiling.

In either case, it may be desirable to provide a false ceiling secured by the elongated duct 31 in a position below the ceiling 51.

The duct 31 together with the wall portions 67 may form a partition between the rooms 53 and 55. It may be desirable to provide sound insulation between these rooms and since side walls 33 and 35 are both perforated, a sound absorbing barrier 69 is provided in the elongated duct 31 itself. Barrier 69 separates the walls 33 and 35 to provide the sound insulation. The sound absorbing barrier will also be effective to absorb sound from the rooms in a manner similar to that effected by sound absorbing material placed on the ceiling.

As can be seen more clearly in FIGURE 4, the elongated ducts are secured together at their intersections by means of a rigid conduit 71 which may serve to pass cables between the conduit 39 and 43 and into wall sections therebelow.

Figure 5:
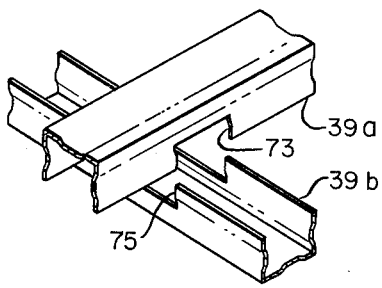
FIGURE 5 is a detailed perspective view showing the connection to the duct work as shown in the grid of FIGURE 4.

The cross connections of the conduits themselves are shown in FIGURE 5, wherein conduits 39a and 39b are each shown with notched matching portions 73 and 75. Thus, it is seen that cables may not only be passed along the length of a conduit but may be passed about corners at the intersections of the duct work itself.

Moreover, it is noted that the elongated ducts 31 are open to one another at the intersections whereby air from the air distributor may be passed not only along straight runs of the duct but also around corners as shown by the arrow 77 in FIGURE 4. If it is desired to use certain of the elongated ducts as return ducts, it is apparent that the intersection of these return ducts with the supply ducts should be blocked off to isolate the ducts from each other.

Figure 6:
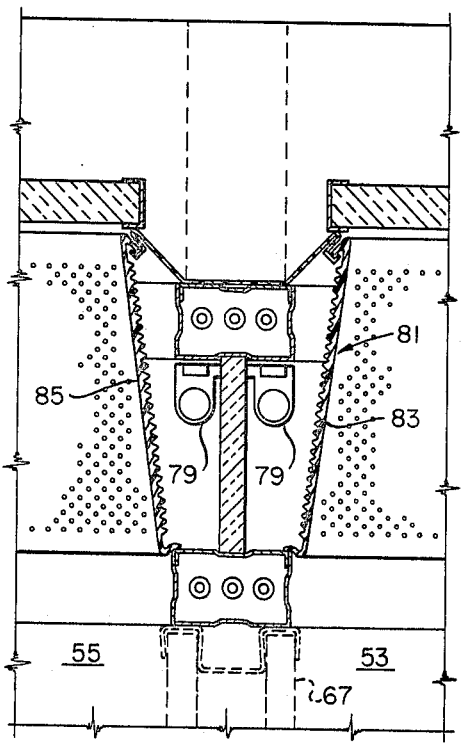
FIGURE 6 is a detailed sectional view similar to FIGURE 3 but showing a different embodiment of the invention.

Referring to FIGURE 6, another embodiment of the invention is shown which is similar to that of FIGURE 3 but includes lighting fixtures 79 on the inside of the elongated duct 81 rather than on the top thereof as shown in FIGURE 3. In this embodiment, the walls 83 and 85 of the duct may be of translucent material whereby light may pass directly from the fixture 79 to the rooms 53 and 55. In this embodiment also, the walls 83 and 85 are provided with distributed perforations for the passage of air from the duct itself into the rooms 53 and 55.

Figure 7:
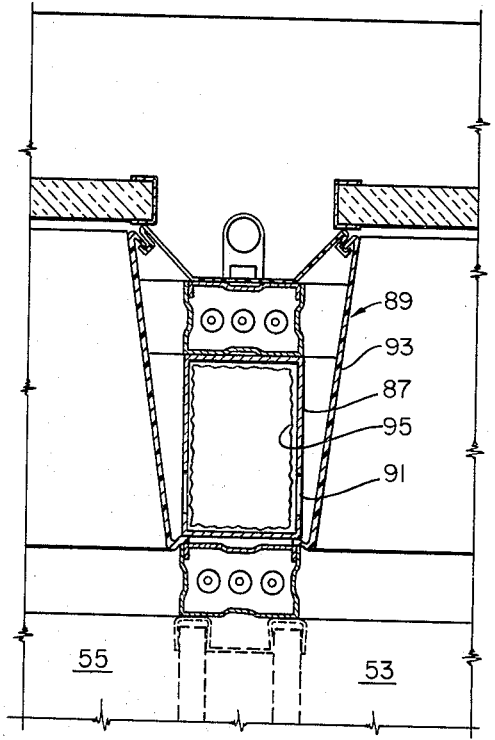
FIGURE 7 is a detailed sectional view similar to FIGURE 3 but showing a still different embodiment of the invention.

Referring to FIGURE 7, still another embodiment of the invention is shown somewhat similar to that shown in FIGURE 3, but which includes an additional duct which may be known as a delivery duct 87. The delivery duct 87 may be substantially similar to the conventional rectangular cross section heating and/or air-conditioning ducts presently in use. The delivery duct 87 is co-extensive with the elongated duct 89 and is in communication with the air distributor.

Registers 91 in the delivery duct 87 may serve to regulate the amount of air flow from the interior of the delivery duct. In this embodiment, the walls 93 of the elongated duct serve merely as diffusers. Thus, it is apparent that the spaced registers 91 may either include individual dampers or may be of graduated size such that the passage of the air therethrough along the entire length of the elongated environmental duct may be constant regardless of the distance from the air distributor itself. Here, as in the embodiments of FIGURES 3 and 6, it is desirable to provide sound insulation. To this end, the delivery duct 87 is provided with sound absorbing material 95.

Figure 8:
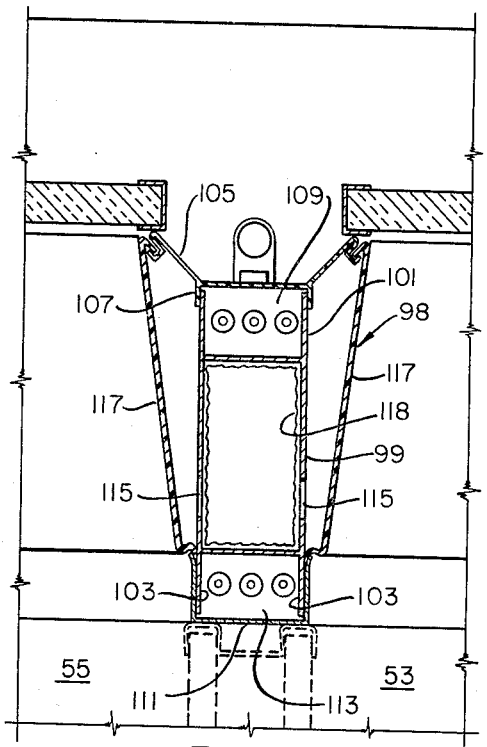
FIGURE 8 is another detailed sectional view similar to FIGURE 3 but showing still another embodiment of the invention.

In FIGURE 8, still another embodiment of the invention is shown which is somewhat similar to the embodiment shown in FIGURE 7. Within the elongated duct 98, this embodiment includes a delivery duct 99 having additional side walls 101 extending upwardly beyond the duct and further, additional side walls 103 extending downwardly beyond the duct 99, the walls 101 and 103 form channels above and below the duct. The top 105 of the elongated duct includes downwardly extending flanges 107 which cooperate with the upwardly extending side portions 101. The top 105 and the extended side portions 101 together form a conduit 109 which may be employed to carry cables for the lighting system.

A U-shaped channel 111 is fitted over the side portions 103 to form a second conduit 113 which may be used to carry cables for audio, video intercoms as well as signal or clock systems.

Like the embodiment of FIGURE 7, the delivery duct 99 is co-extensive with the elongated duct 98 and is in communication with the air distributor. Again, the delivery duct may include registers 115 to regulate the amount of air flow from its interior so that the walls 117 of the duct 98 merely serve as diffusers. Again, sound absorbing material 118 may be applied to the walls of the delivery duct 99 to provide sound insulation between the rooms 53 and 55.

Figure 10:
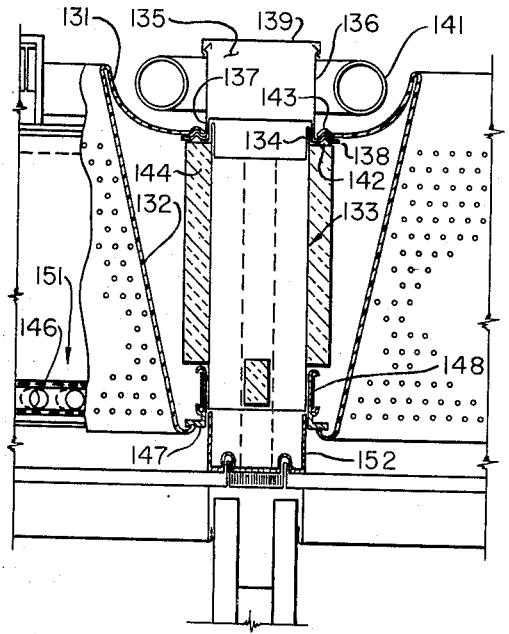
FIGURE 10 is a detailed sectional view taken generally along the line 10—10 of FIGURE 9.
Figure 11:
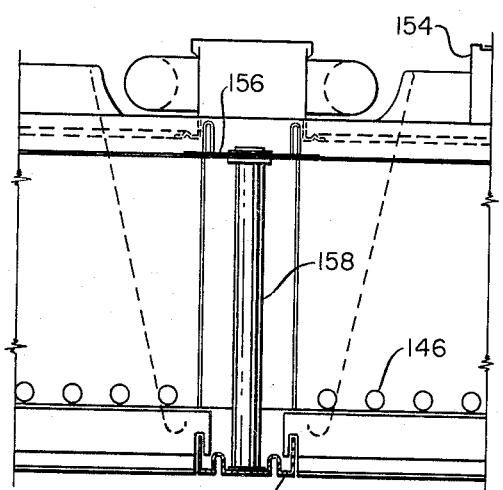
FIGURE 11 is a detailed sectional view taken generally along the line 11—11 of FIGURE 9.
Figure 9:
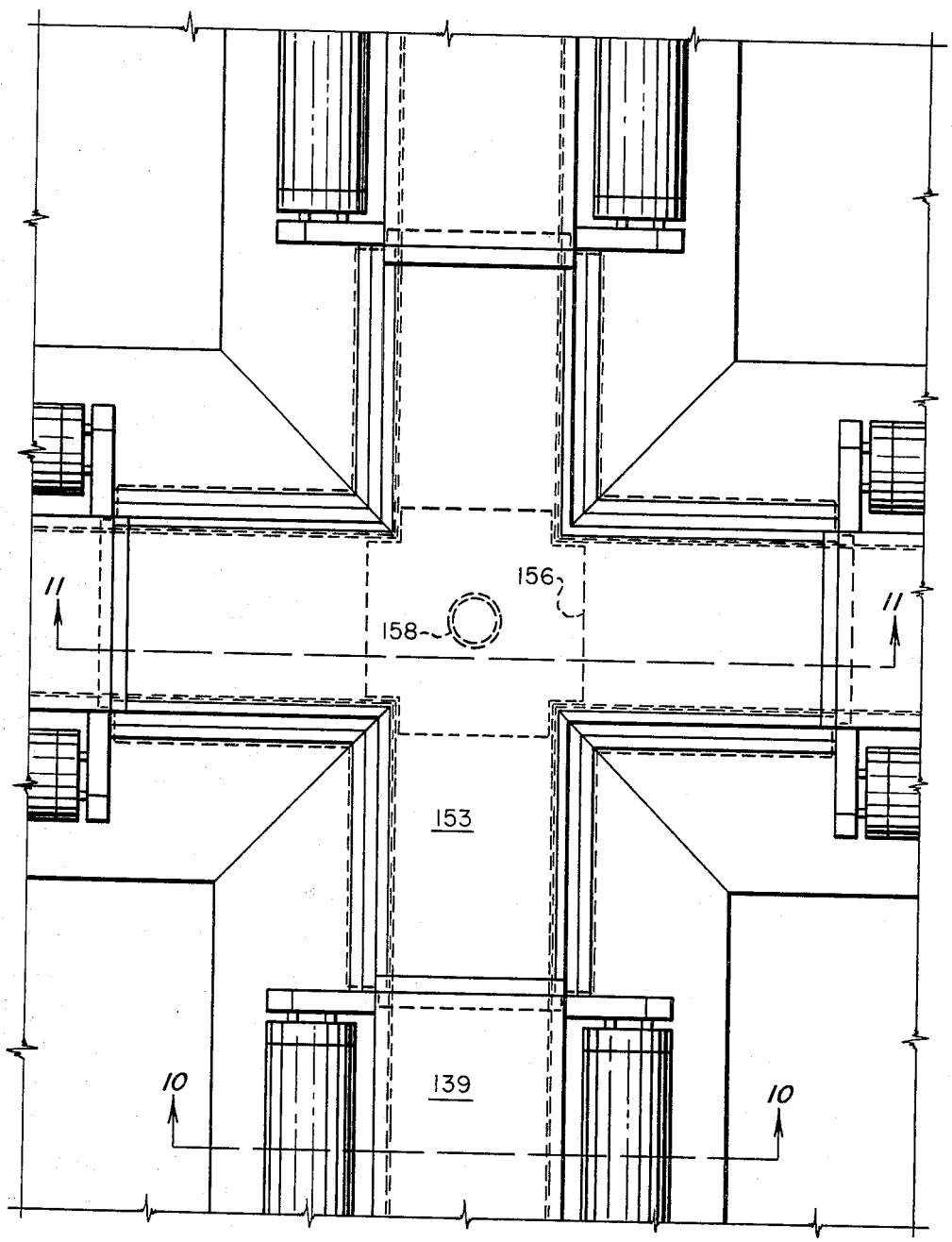
FIGURE 9 is a plan view of still a different embodiment of the invention.

In FIGURES 9-11, there is shown another embodiment of the invention which is similar to the embodiment of FIGURES 7 and 8, that is, an embodiment which includes a delivery duct, and an elongated duct in communication with air distribution means.

Referring particularly to the figures, it is seen that the upper transparent or reflective wall 131 of the distribution duct is formed integral with the perforated side wall 132. As previously described, this member may be formed of plastic material.

The delivery duct which runs generally centrally of the grid is formed of a sheet metal box-shaped member 133 having extended sides 134. A channel-like member 136 having a downwardly extended portion 137 bent outwardly to form a flange 138 is adapted to cooperate with the extended portions 134 to form a raceway 135 for lighting, gas, water, etc., piping. A cover 139 may be provided for the channel-like member 136 and forms a housing for the ballast of the fluorescent fixtures 141 which are secured to the sides of the same in cooperative relationship with the upper wall 131. The flange 138 may include a ridge 142 which is adapted to receive the grooved portion 143 of the wall 131 for locking. The side walls of the delivery duct may be provided with insulation 144 as previously described. Near the lower portion of the side walls there may be provided a plurality of openings 146. A member 147 is disposed adjacent the lower portion of the side walls of the box shaped member. The member 147 is constructed to leave the openings 146 unobstructed and is secured to the side walls. A member 147 is adapted to receive a slide to 148 having openings therein spaced with the same spacing as the openings 146 and which may be thus in position to control the degree of excessible opening of the openings 146 as shown more clearly in FIGURE 10 at 151. A channel-like member 152 cooperates with the member 147 to form a second raceway for carrying intercommunication wiring, etc., as previously described.

The channel-like member 136 which houses the ballast and which cooperates to form the raceway 135 may be terminated short of the intersection as shown in FIGURE 9. There is then provided a cover plate 153 which is in the form of a cross which cooperate with the channel to close the same. Thus, after the grid has been assembled, the cover may be placed on top to form the requisite enclosure. A smaller cover plate 156 may be provided at the intersection and cooperates with the upper wall of the delivery duct to close the opening formed at the intersection. Similarly, a lower cover plate may be provided to close the lower wall of the delivery duct at the intersection.

The complete assembly may be retained in assembled relationship at the intersections by means of a post 158 which cooperates between the cover plate 156 and the lower cover member 159 to maintain the assembly in assembled relationship. Suitable supporting means may cooperate with the post for supporting the grid-like structure on the member 159 from the ceiling. The grid-like environmental control system may also be attached directly to the ceiling. For such purposes, a reflector is placed over the lights to reflect the light downwardly into the room.

Figure 12:
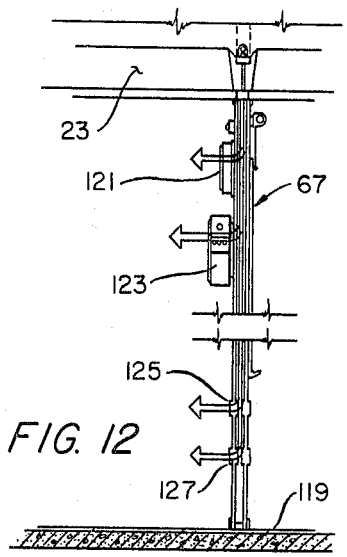
FIGURE 12 is a detailed elevational section showing a wall partition suitable for use in connection with the environmental control system.

Referring to FIGURE 12, there is shown a sectional view of a typical partition which may be used in a system in accordance with the invention. Here, there is shown the duct system 23 with the partition 67 including a portion of a duct and extending to the floor 119. Various environmental conveniences may be supplied to the partition from the duct 23 itself, and as examples are shown the signal and clock systems 121, audio and video systems 123, intercom systems 125, and the usual electrical convenience outlets 127. Cables for each of these environmental conveniences may be supplied through the conduits 43 of the duct structure 23.

Thus, it is seen that an improved environmental control system has been provided which may be easily and quickly installed due to the fact that several environmental elements are included in a single unit. The system is economical because of employing the same elements for a number of functions.

I claim:

1. An environmental control system for use in an integrated building comprising elongated air transfer duct means for passing air longitudinally therethrough and further including distribution means for distributing air passing longitudinally within the duct means from the interior to the exterior thereof, at least one wall of said duct forming part of a wiring conduit means for receiving electrical wiring therein, and a lighting fixture secured to said duct means and electrically connected to the wiring within said wiring conduit means.

2. An environmental control system as defined in claim 1 wherein said means for distributing air includes distributed perforations located in at least one wall of the duct means.

3. An environmental control system as defined in claim 1 wherein said lighting fixture is secured within said duct means and wherein at least one wall of said elongated duct means is translucent.

4. An environmental control system as defined in claim 1 wherein said elongated duct means includes two side walls, each of said side walls including perforation means therein for transferring the air passing longitudinally of the duct means between the interior and exterior of the duct means, and a sound absorbing barrier extending along and within said elongated duct means.

5. An environmental control system as defined in claim 1 wherein a second wall of said elongated duct means forms a part of second wiring conduit means for receiving electrical wiring therein.

6. An environmental control system for use in a building, comprising elongated air transfer duct means for passing air longitudinally therethrough, at least one wall of said duct forming part of a wiring conduit means for receiving electrical wiring therein, the top wall of said elongated duct comprising an upwardly directed reflector, and a lighting fixture secured to said elongated duct means in cooperative relationship with said reflector and further electrically connected to the wiring within said wiring conduit means.

7. An environmental control system for use in a building, comprising an elongated air transfer duct means for passing air longitudinally therethrough, at least one wall of said duct forming part of a wiring conduit means for receiving electrical wiring therein, the top wall and at least one other wall being translucent, and a lighting fixture secured to the top of said elongated duct means and electrically connected to the wiring within said wiring conduit means.

8. An environmental control system for use in a building, comprising an elongated air transfer duct means for passing air longitudinally therethrough, at least one wall of said duct forming part of a wiring conduit means for receiving electrical wiring therein, said elongated duct means including a delivery duct therein, said delivery duct including means for permitting the passage of air from within said delivery duct to the outside thereof and for regulating the volume of said passage, and a lighting fixture secured to said elongated duct means and electrically connected to the wiring within said wiring conduit.

9. An environmental control system as defined in claim 8 wherein the means for permitting passage of air includes spaced openings in at least one wall of said delivery duct.

10. An environmental control system as defined in claim 8 together with sound absorbing material on at least one wall of said delivery duct.

11. In a building structure, first and second rooms each having a floor and a ceiling, a partition separating said rooms, an environmental duct included in said partition, one wall of said duct comprising a wiring conduit having electrical wiring therein, a lighting fixture secured to said duct and electrically connected to the wiring within said wiring conduit, at least one wall of said duct including perforations therein, and an air distributor in communication with said environmental duct.

12. A building structure as defined in claim 11 wherein said ceiling is reflective and wherein the top wall of said environmental duct comprises an upwardly directed reflector, said lighting fixture being secured to said duct within said reflector and said environmental duct being spaced downwardly from said ceiling.

13. A building structure as defined in claim 12 together with a false ceiling spaced downwardly from the reflective ceiling, said false ceiling being secured to said environmental duct.

14. A building structure as defined in claim 11 wherein at least one wall of said environmental duct is translucent and wherein said lighting fixture is secured within said environmental duct.

15. A building structure as defined in claim 11 wherein the top wall and at least one other wall of said environmental duct are translucent, and wherein said lighting fixture is secured on the top of said elongated duct.

16. A building structure as defined in claim 11 wherein said environmental duct includes two side walls, each of said side walls including perforations therein, and a sound absorbing barrier extending along and within said environmental duct, said sound absorbing barrier separating said side walls.

17. A building structure as defined in claim 11 wherein a second wall of said environmental duct comprises a second wiring conduit.

18. A building structure as defined in claim 11 wherein said environmental duct includes a delivery duct therein, said delivery duct including means for permitting the passage of air from within the same to the outside thereof, and for regulating the volume of such passage.

19. A building structure as defined in claim 18 together with sound absorbing material on at least one wall of said delivery duct.

20. An environmental control system including elongated air transfer duct means for passing air longitudinally therethrough, the lower wall of said duct means defining in part electrical conduit means for receiving electrical wiring therein, a cover for said conduit means, said cover serving to support the system, lighting means supported on the upper wall of said air transfer duct means, side walls removably secured to said air transfer duct means, said side walls including an upper portion which cooperates with the lighting means and downwardly extending inwardly inclined side wall portions.

21. An environmental control system as in claim 20 wherein said air transfer duct means includes means for regulating the flow of air out of the same.

(References on following page)

References Cited by the Examiner

UNITED STATES PATENTS

| | | | |
|---|---|---|---|
| 2,659,807 | 11/53 | Wakefield | 240—9 |
| 2,759,093 | 8/56 | Ferar et al. | 240—9 X |
| 2,831,104 | 4/58 | Brandt | 240—41.1 X |
| 2,833,199 | 5/58 | Wakefield | 240—9 |
| 2,888,113 | 5/59 | Schwartz et al. | 240—9 X |
| 2,951,147 | 8/60 | Gilbert | 240—78 X |
| 2,985,090 | 5/61 | Quin | 240—9 |
| 2,990,470 | 6/61 | Bodian et al. | 240—51.11 |
| 3,033,981 | 5/62 | Kushner | 240—51.11 |

FOREIGN PATENTS 593,235  10/47  Great Britain.

NORTON ANSHER, *Primary Examiner.*